United States Patent
Hall et al.

(10) Patent No.: US 11,384,828 B2
(45) Date of Patent: Jul. 12, 2022

(54) LOCKING RETAINER RING FOR A SHAFT ASSEMBLY

(71) Applicant: Laitram, L.L.C., Harahan, LA (US)

(72) Inventors: Benson Hall, Columbus, OH (US); Steuart Turner, Harvey, LA (US); Mitchell G. Pansano, Jr., Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 479 days.

(21) Appl. No.: 16/673,153

(22) Filed: Nov. 4, 2019

(65) Prior Publication Data

US 2021/0131550 A1    May 6, 2021

(51) Int. Cl.
*F16H 55/30* (2006.01)
*F16C 3/02* (2006.01)

(52) U.S. Cl.
CPC ............. *F16H 55/30* (2013.01); *F16C 3/02* (2013.01); *F16H 2055/306* (2013.01)

(58) Field of Classification Search
CPC ....... F16H 55/30; F16H 2055/306; F16C 3/02
USPC .......................................... 464/81, 165, 198
See application file for complete search history.

(56) References Cited

U.S. PATENT DOCUMENTS

| | | | |
|---|---|---|---|
| 2,052,900 A | 9/1936 | Searles et al. | |
| 3,724,285 A | 4/1973 | Lapeyre | |
| 5,316,522 A * | 5/1994 | Carbone | F16H 55/12 474/903 |
| 5,544,740 A | 8/1996 | Kissee | |
| 8,272,803 B2 | 9/2012 | Lally | |
| 2005/0061633 A1 * | 3/2005 | Vetter | B65G 23/06 198/834 |
| 2010/0331128 A1 * | 12/2010 | Johnson | A01C 19/04 474/158 |

FOREIGN PATENT DOCUMENTS

| | | | |
|---|---|---|---|
| DE | 2354902 C3 * | 10/1973 | |
| DE | 2354902 A1 | 5/1975 | |
| GB | 558868 A * | 7/1942 | |
| GB | 558868 A | 1/1944 | |

OTHER PUBLICATIONS

Intralox Engineering Manual Modular Plastic Conveyor Belts, pp. 382-384, Intralox, L.L.C., Harahan, Louisiana, U.S.A., 2016.
International Search Report and Written Opinion of the International Searching Authority, PCT/US2020/057298, dated Feb. 26, 2021, European Patent Office, Rijswijk, NL.

* cited by examiner

*Primary Examiner* — Gene O Crawford
*Assistant Examiner* — Emily Rose Kincaid
(74) *Attorney, Agent, or Firm* — James T. Cronvich

(57) ABSTRACT

Retainer rings for locking in an N-sided shaft to restrict axial movement of components sandwiched between them. The retainer rings have inner edges bounding a central bore. The inner edges are defined by a series of N arcs whose distance from the bore's center decreases gradually along the inner edge from a first end to a second end of each arc. The rings are slid on to the shaft with the corners of the shaft aligned with the first ends of the arcs. Then the rings are rotated on the shafts toward the second ends of the arcs until the corners of the shafts jam against the inner edges. A special spanner wrench can be used to tighten and loosen the rings on the shaft.

18 Claims, 4 Drawing Sheets

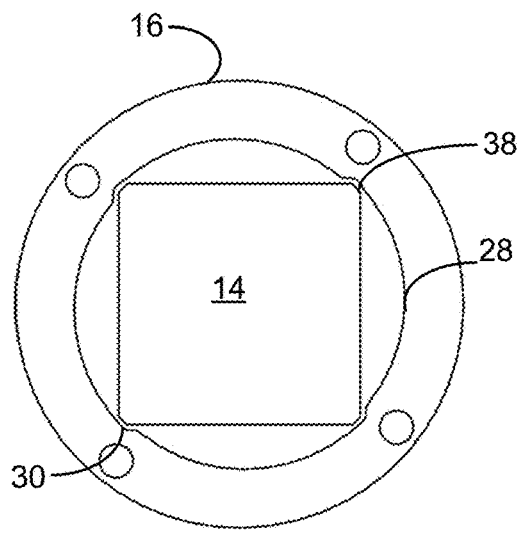
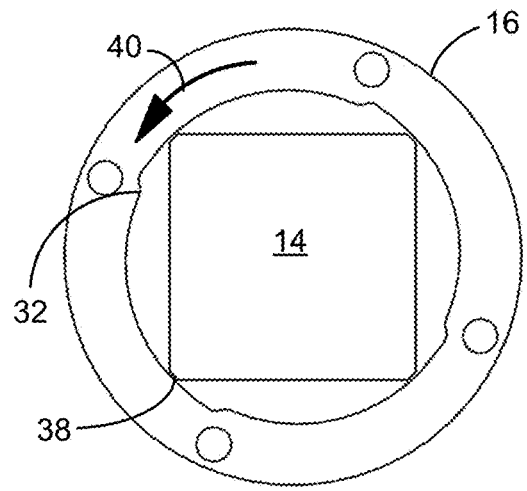
FIG. 3A
FIG. 3B
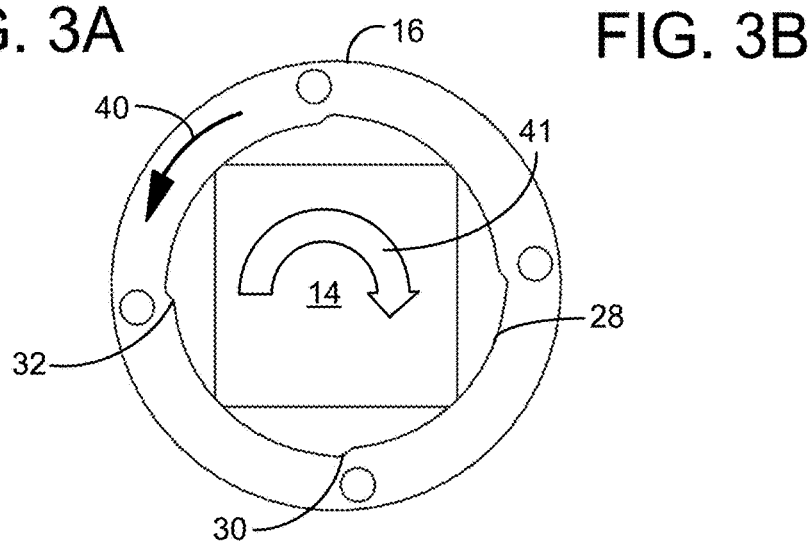
FIG. 3C
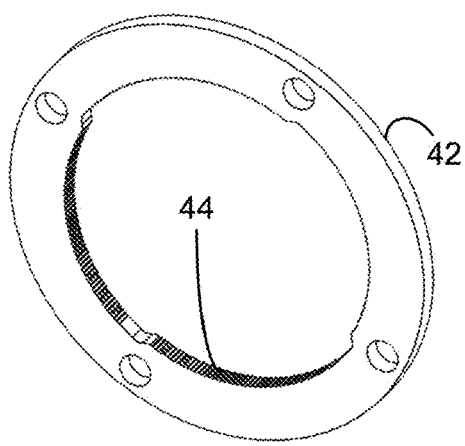
FIG. 4

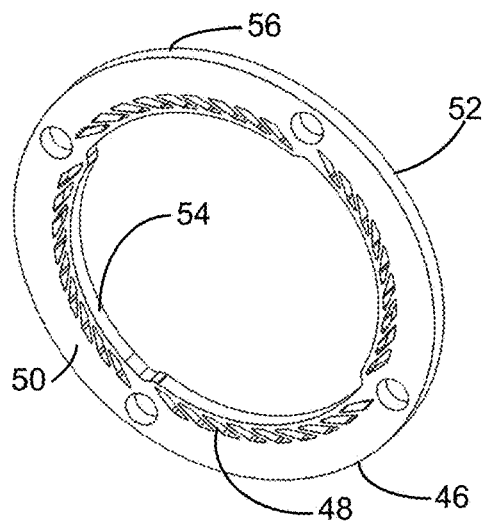
FIG. 5
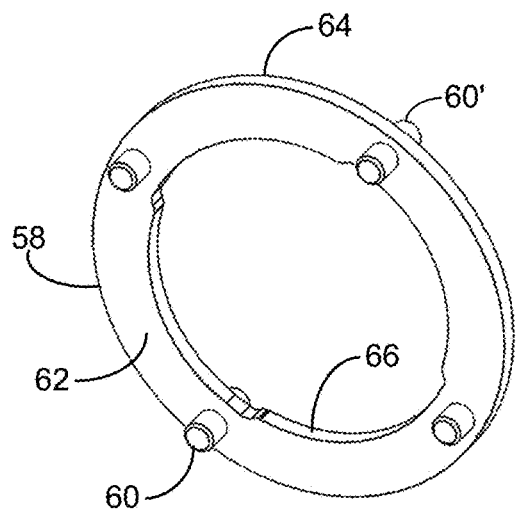
FIG. 6
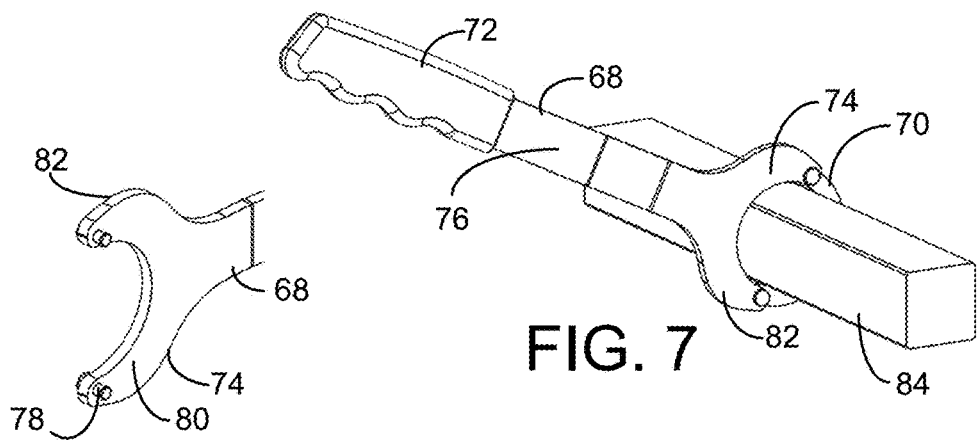
FIG. 7
FIG. 7A
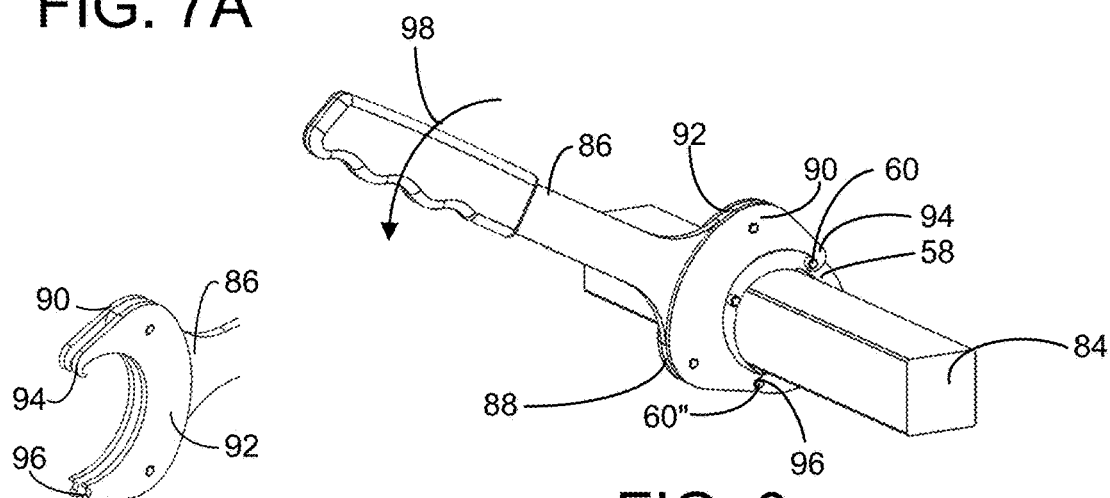
FIG. 8
FIG. 8A

_US 11,384,828 B2_

LOCKING RETAINER RING FOR A SHAFT ASSEMBLY

BACKGROUND

The invention relates generally to power-driven conveyors. In particular it relates to retainer rings for restricting the movement of conveyor components mounted on a shaft and to a related method.

Endless conveyor belts are trained around drive and idle sprockets mounted on rotating shafts. Unlike flat belts, which are frictionally driven, modular conveyor belts and chains constructed of rows of modules joined together at hinge joints are positively driven by engagement with teeth on drive sprockets. To prevent a modular belt from wandering too far laterally, a single sprocket is typically confined to a short axial region or a fixed position along the drive shaft. The teeth of the confined sprocket engage drive-receiving structure in the modular belt to drive as well as track the belt.

Retainer rings are mounted on the shaft on opposite sides of the sprocket to restrict its axial movement. For example, standard external shaft rings residing in circumferential grooves on a round shaft are used to confine sprockets. U-shaped retainer rings with hooks at their two ends that snap into place in corner grooves are used on square shafts to confine sprockets. Self-set retainer rings, which do not require grooves in the shaft, are also used to confine sprockets. Instead of being biased in place in a shaft groove by spring action inherent in the shapes and material of the retainer rings, the self-set retainer rings are affixed to the shaft by set screws threaded through the rings and tightened against the shaft.

But all these retainer rings are not optimal in hygienic applications. Threaded retainer rings and set screws and shaft grooves are not easy to clean. They can harbor bacteria, which is unacceptable in many hygienic applications.

SUMMARY

A retainer ring embodying features of the invention for restricting the axial movement of a sprocket mounted on an N-sided polygonal shaft comprises a first side face and an obverse second side face defining the axial width of the retainer ring. An inner edge extends axially between the first and second side faces and bounds a central bore. The inner edge is formed by a series of N arcs each of whose distance from the center of the bore decreases gradually from a maximum distance at a first end of each arc to a minimum distance at an opposite second end of each arc.

A shaft assembly embodying features of the invention comprises a polygonal shaft having N sides, a component mounted on the shaft, and first and second retainer rings mounted on the shaft on opposite sides of the component. Each of the retainer rings includes a first side face and an obverse second side face defining the axial width of the retainer ring and an inner edge that extends axially between the first and second side faces and bounds a central bore receiving the shaft. The inner edge is formed by a series of N arcs each of whose distance from the center of the bore decreases gradually from a maximum distance at a first end of each arc to a minimum distance at an opposite second end of each arc.

A method embodying features of the invention for restricting the axial movement of a component along an N-sided polygonal shaft comprises: (a) mounting a component on an N-sided polygonal shaft having N corners; (b) axially aligning a first retainer ring having a central bore bounded a series of N arcs each of whose distance from the center of the bore decreases gradually from a maximum distance at a first end of each arc to a minimum distance at an opposite second end of each arc with the N corners of the shaft; (c) sliding the first retainer ring along the shaft to a first axial position; (d) axially aligning a second retainer ring having a central bore bounded a series of N arcs each of whose distance from the center of the bore decreases gradually from a maximum distance at a first end of each arc to a minimum distance at an opposite second end of each arc with the N corners of the shaft; (e) sliding the second retainer ring along the shaft to a second axial position such that the component is between the first and second retainer rings; (f) rotating the first and second retainer rings in a tightening direction that moves the second ends of the arcs closer to the corners of the shaft to tighten the first and second retainer rings on the shaft; and (g) restricting the component to an axial range of movement from the first axial position to the second axial position.

BRIEF DESCRIPTION OF THE DRAWINGS

FIGS. 3A-3C are side elevation views of a retainer ring as in FIG. 2 showing the sequence of locking the retainer ring on a shaft.

FIG. 4 is an axonometric view of a retainer ring as in FIG. 2 with a serrated inner edge around the ring's bore.

FIG. 5 is an axonometric view of a retainer ring as in FIG. 2 with reliefs near the inner edge.

FIG. 6 is an axonometric view of a retainer ring as in FIG. 2 with studs extending outwardly from the ring's side faces.

FIG. 7 is an isometric view of a spanner wrench with pins to tighten and loosen a retainer ring as in FIG. 2, 4, or 5 on a shaft; and FIG. 7A is an enlarged isometric view of the head portion of the spanner wrench of FIG. 7.

FIG. 8 is an isometric view of a spanner wrench with a hooked end to tighten and loosen a retainer ring with studs as in FIG. 6; and FIG. 8A is an enlarged isometric view of the head portion of the spanner wrench of FIG. 8.

DETAILED DESCRIPTION

Figure 1A:
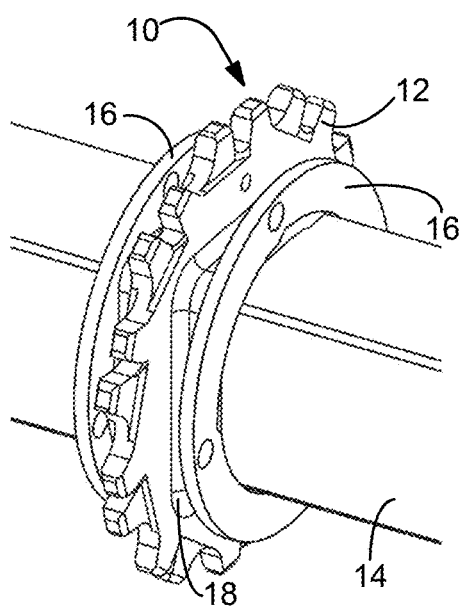
FIGS. 1A and 1B are axonometric and top plan views of a shaft assembly including a sprocket retained on a shaft by a pair of retainer rings embodying features of the invention.
Figure 1B:
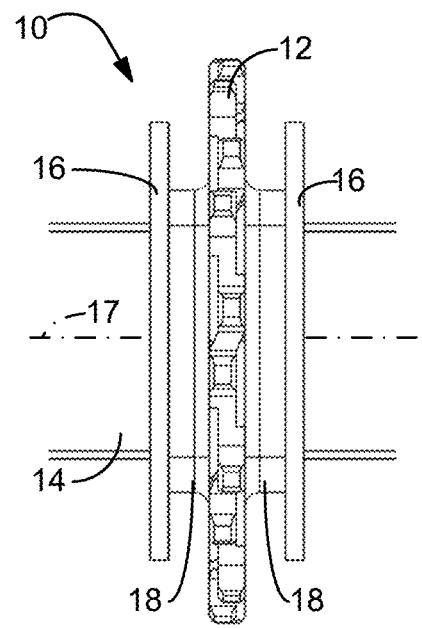

A shaft assembly embodying features of the invention is shown in FIGS. 1A and 1B. The shaft assembly 10 comprises a sprocket 12 retained on a square shaft 14 by a flanking pair of retainer rings 16. The retainer rings 16 sandwich the sprocket 12 and restrict its range of motion along the axis 17 of the shaft. The retainer rings 16 are tightened on the shaft 14 against the hub 18 of the sprocket to fix its axial position on the shaft. But the rings 16 could be spaced farther apart to give the sprocket 12 a limited range of axial movement.

Figure 2:
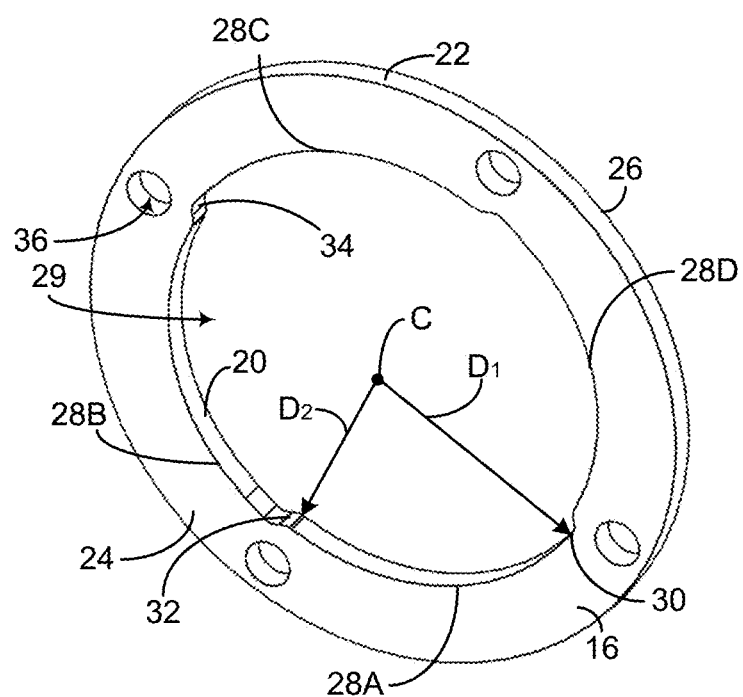
FIG. 2 is an enlarged axonometric view of a retainer ring as in FIGS. 1A and 1B.

The retainer ring 16 is shown in greater detail in FIG. 2. The ring 16 is made of a flat plate with an inner edge 20 and a radially outer edge 22 that extend axially from a first side face 24 to an obverse second side face 26 across the plate's axial width, or thickness. In this version the inner and outer edges 20, 22 are smooth, and the outer edge is circular. The inner edge is formed by a series of four circumferentially consecutive eccentric circular arcs 28A, 28B, 28C, 28D bounding a central bore 29. The distance of each curved arc 28A-28D from the center C of the central bore 29 decreases gradually and monotonically from a maximum distance $D_1$ at a first end 30 of each arc to a minimum distance $D_2$ at an opposite second end 32. Transition regions 34 between the first and second ends 30, 32 of consecutive arcs 28 are characterized by relatively sharp steps in the inner edge 20. Holes 36 extend through the ring's thickness and through the first and second side faces 24, 26. The holes are shown positioned every 90° near the second ends 32 of the arcs where the ring 16 is stronger because, at those locations, there is more material between the inner and outer edges 20, 22 of the ring. But the holes 36 could be positioned at more or fewer positions on the ring and at other circumferential positions than those shown.

FIGS. 3A-3C illustrate a sequence of steps in the tightening of the retainer ring 16 on the square shaft 14. First, as shown in FIG. 3A, the four corners 38 of the square shaft 14 are axially aligned with the first ends 30 of the curved arcs 28. (The four corners 38 are shown as chamfered in this example, but they could be unchamfered.) The ring 16 is then slid axially along the shaft 14 to its desired axial position. As shown in FIG. 3B, the retainer ring 16 is rotated relative to the shaft 14 in a tightening direction (counterclockwise in this example) indicated by the arrow 40. The rotation of the ring 16 in the tightening direction 40 moves the second ends 32 of the curved arcs 28 closer to the corners 38 of the shaft 14 until the ring is jammed on the shaft, as shown in FIG. 3C, with the corners locked between the first and second ends 30, 32 of the arcs 28. When the shaft 14 is driven in its normal operating direction of rotation 41, it further tightens the ring 16. To unlock the retainer ring 16 from the shaft 14, the ring is rotated in the reverse direction (clockwise in FIGS. 3B and 3C). After one retainer ring 16 is affixed to the shaft 14, the sprocket 12, as in FIGS. 1A and 1B, is slid onto the shaft to a selected axial position. Then a second retainer ring 16 is slid onto the shaft to a selected axial position such that the sprocket 12 is between the two rings. The second ring 16 is then rotated in the tightening direction 40 to lock onto the shaft 14 and restrict the axial movement of the sprocket 12 to a region on the shaft between the two locked retainer rings as in FIGS. 1A and 1B.

FIG. 4 shows another version of a retainer ring 42 that differs from the retainer ring of FIG. 2 in that the inner edge 44 is serrated, knurled, splined, or otherwise textured with a rough surface to provide a better bite on a shaft than is provided by the smooth inner edge 20 of the ring 16 of FIG. 2.

FIG. 5 shows yet another version of a retainer ring 46 having a series of reliefs 48 that extend axially through first and second side faces 50, 52 between inner and outer edges 54, 56 of the ring. The reliefs 48 are closer to the inner edge 54 than to the outer edge 56. The reliefs 48 make the inner edge 54 more compliant for a stronger grip on a shaft. Although shown with a smooth inner edge 54, the retainer ring 46 could have a textured inner edge.

The retainer ring 58 in FIG. 6 differs from the other rings in that it has first and second studs 60, 60' extending axially outward from the ring's side faces 62, 64 instead of holes. The studs 60 at the first side face 62 are collinear with the corresponding studs 60' at the second side face 64 in this example. The first and second studs 60, 60' could be separate pieces or opposite ends of a single piece that extends through the ring 58. The ring's inner edge 66, although shown as smooth, could be textured. And the ring 58 could include reliefs 48 as in FIG. 5.

A tool 68 for tightening and loosening a retainer ring 70 having holes, such as the retainer rings 16, 42, 46 of FIGS. 2, 4, and 5, is shown in FIGS. 7 and 7A. The tool 68 is a spanner wrench having a handle 72 at one end connected to a head 74 at the other end by a shank 76. The head 74 of the spanner 68 is C-shaped and has pins 78 that extend outward of one or both sides 80, 82 of the head. The pins 78 are spaced so as to mate with a pair of the holes in the retainer ring 70. Once the pins 78 are inserted in the mating holes, the spanner 68 is rotated to tighten or loosen the retainer ring 70 on a shaft 84.

A spanner wrench 86 for use with a retainer ring 58 with studs 60 as in FIG. 6 is shown in FIGS. 8 and 8A. The spanner 86 has a head 88 having two identical spaced C-shaped portions 90, 92. The two C-shaped portions 90, 92 are spaced apart by a distance slightly greater than the thickness of the ring 58. One end of the C terminates in a hook 94, and the other end terminates in a recess 96. The hooks 94 on the two C-shaped portions hook around one pair of the ring's studs 60. The recesses 96 receive an opposite pair of studs 60", which act as a fulcrum for the lever action of the spanner as it is rotated in direction of the arrow 98 to tighten the retainer ring 58 on the shaft 84. To loosen the ring 58 on the shaft 84, the spanner wrench 86 is reversed so that the hooks 94 engage the studs 60" and the recesses 96 engage the studs 60.

Figure 9:
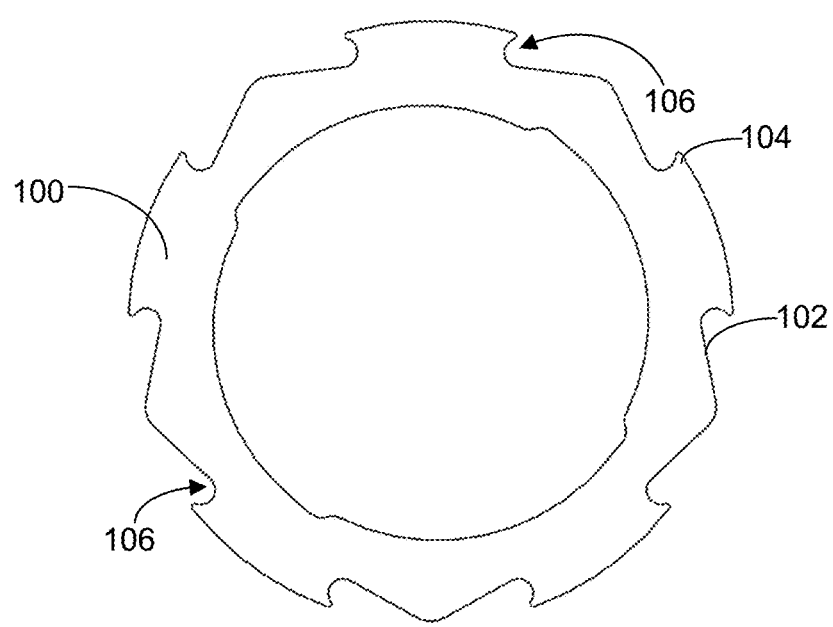
FIG. 9 is a side view of another version of a retainer ring usable in a shaft assembly as in FIG. 1.

Another version of a retainer ring embodying features of the invention is shown in FIG. 9. The retainer ring 100 has a non-circular outer edge 102 with a pattern of hooks 104 that can be engaged by a spanner wrench having, for example, a pin parallel to the ring's axis between a pair of parallel C-shaped head portions near each end of the C. The pins in such a spanner would engage undercuts 106 in the ring's outer edge 102 radially inward of the hooks 104. So holes or studs as in other versions of retainer rings are not required in this version.

Although the invention has been described in detail with regard to specific versions, other versions are possible. For example, all the retainer rings described in detail are designed for square shafts. But the basic design can be modified to accommodate other N-sided polygonal shafts, such as triangular, pentagonal, hexagonal, and so on. For other N-sided shafts, the inner edge is formed by a series of N arcs to match the number of sides on the polygonal shaft. As another example, the curved arcs are shown in the exemplary versions as eccentric circular arcs of constant curvature, but the arcs could define other curves having a curvature that changes along the arc's length so as to gradually decrease the distance of the inner edge from the center of the ring's central bore along each arc. Furthermore, the retainer rings in the exemplary versions are described as locking on a shaft to restrict the axial movement of sprockets on the shaft. But the rings can be used to restrict the axial movement of other shaft mounted components, such as toothless wheels, including pulleys and rollers. So, as these few examples suggest, the scope of the claims is not meant to be limited to the details of the exemplary versions used to describe the features of the invention.

What is claimed is:

1. A retainer ring for restricting the axial movement of a sprocket mounted on an N-sided polygonal shaft, the retainer ring comprising:
    a first side face and an obverse second side face defining the axial width of the retainer ring;
    an inner edge extending axially between the first and second side faces and bounding a central bore;

wherein the inner edge is formed by a series of N arcs each of whose distance from the center of the bore decreases gradually from a maximum distance at a first end of each arc to a minimum distance at an opposite second end of each arc.

2. A retainer ring as claimed in claim 1 wherein the inner edge is serrated.

3. A retainer ring as claimed in claim 1 comprising at least two holes extending axially through the first and second side faces.

4. A retainer ring as claimed in claim 3 wherein the at least two holes are formed proximate the first ends of at least two of the arcs.

5. A retainer ring as claimed in claim 1 comprising at least two first studs extending axially outward of the first side face and at least two second studs extending axially outward of the second side face.

6. A retainer ring as claimed in claim 5 wherein each of the at least two first studs is collinear with an associated one of the at least two second studs.

7. A retainer ring as claimed in claim 5 wherein the at least two first and second studs are positioned proximate the first ends of at least two of the arcs.

8. A retainer ring as claimed in claim 1 comprising a radially outer edge and a plurality of reliefs extending axially through the first and second side faces between the inner edge and the radially outer edge.

9. A retailer ring as claimed in claim 8 wherein the reliefs are closer to the inner edge than to the radially outer edge.

10. A retainer ring as claimed in claim 1 comprising a circular radially outer edge.

11. A retainer ring as claimed in claim 1 comprising a radially outer edge having a pattern of hooks.

12. A retainer ring as claimed in claim 1 wherein the retainer ring is made from a flat plate.

13. A shaft assembly comprising:
a polygonal shaft having N sides;
a component mounted on the shaft;
first and second retainer rings mounted on the shaft on opposite sides of the component, each of the retainer rings including:
a first side face and an obverse second side face defining the axial width of the retainer ring;
an inner edge extending axially between the first and second side faces and bounding a central bore receiving the shaft;
wherein the inner edge is formed by a series of N arcs each of whose distance from the center of the bore decreases gradually from a maximum distance at a first end of each arc to a minimum distance at an opposite second end of each arc.

14. A shaft assembly as claimed in claim 13 wherein the shaft has an operating direction of rotation and wherein the first and second retainer rings are mounted on the shaft such that rotation of the shaft in the operating direction pushes the shaft along the arcs toward their second ends to tighten the first and second retainer rings on the shaft.

15. A shaft assembly as claimed in claim 13 wherein the shaft has N corners and wherein the first ends of the N arcs of the first and second retainer rings are axially aligned with the N corners of the shaft to slide the first and second retainer rings on and off the shaft.

16. A shaft assembly as claimed in claim 13 wherein the component is a sprocket or a wheel.

17. A method for restricting the axial movement of a component along an N-sided polygonal shaft, the method comprising:
mounting a component on an N-sided polygonal shaft having N corners;
axially aligning a first retainer ring having a central bore bounded a series of N arcs each of whose distance from the center of the bore decreases gradually from a maximum distance at a first end of each arc to a minimum distance at an opposite second end of each arc with the N corners of the shaft;
sliding the first retainer ring along the shaft to a first axial position;
axially aligning a second retainer ring having a central bore bounded a series of N arcs each of whose distance from the center of the bore decreases gradually from a maximum distance at a first end of each arc to a minimum distance at an opposite second end of each arc with the N corners of the shaft;
sliding the second retainer ring along the shaft to a second axial position such that the component is between the first and second retainer rings;
rotating the first and second retainer rings in a tightening direction that moves the second ends of the arcs closer to the corners of the shaft to tighten the first and second retainer rings on the shaft;
restricting the component to an axial range of movement from the first axial position to the second axial position.

18. The method of claim 17 comprising driving the shaft to rotate in the tightening direction in normal operation.

* * * * *